US012725426B2

(12) United States Patent
Shen et al.

(10) Patent No.: US 12,725,426 B2
(45) Date of Patent: Sep. 1, 2026

(54) RGB-T MULTISPECTRAL PEDESTRIAN DETECTION METHOD BASED ON TARGET AWARE FUSION STRATEGY

(71) Applicant: ZHEJIANG UNIVERSITY, Hangzhou (CN)

(72) Inventors: Huiliang Shen, Hangzhou (CN); Xue Zhang, Hangzhou (CN); Xiaohan Zhang, Hangzhou (CN); Beinan Yu, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 246 days.

(21) Appl. No.: 18/639,914

(22) Filed: Apr. 18, 2024

(65) Prior Publication Data

US 2024/0331403 A1 Oct. 3, 2024

Related U.S. Application Data

(63) Continuation of application No. PCT/CN2023/085308, filed on Mar. 31, 2023.

(51) Int. Cl.
*G06V 20/58* (2022.01)
*G06V 10/56* (2022.01)
(Continued)

(52) U.S. Cl.
CPC .............. *G06V 20/58* (2022.01); *G06V 10/56* (2022.01); *G06V 10/778* (2022.01); *G06V 10/806* (2022.01); *G06V 10/82* (2022.01)

(58) Field of Classification Search
CPC .... G06V 20/58; G06V 10/806; G06V 10/778; G06V 10/56; G06V 10/82; G06V 10/80; G06V 10/58
See application file for complete search history.

(56) References Cited

U.S. PATENT DOCUMENTS

2020/0349846 A1 11/2020 Siboni et al.

FOREIGN PATENT DOCUMENTS

CN 111767882 A * 10/2020 ............. G06N 3/045
CN 113361475 A 9/2021
(Continued)

OTHER PUBLICATIONS

L. Zhang, X. Zhu, X. Chen, X. Yang, Z. Lei, and Z. Liu, "Weakly aligned cross-modal learning for multispectral pedestrian detection," in Proc. IEEE/CVF Int. Conf. Comput. Vis. (ICCV), Oct. 2019, pp. 5126-5136. (Year: 2019).*

(Continued)

*Primary Examiner* — Utpal D Shah
*Assistant Examiner* — Jack Peter Kraynak
(74) *Attorney, Agent, or Firm* — Wiersch Law Group

(57) ABSTRACT

An RGB-T (Thermal) multispectral pedestrian detection method based on a target aware fusion strategy, which aims to accurately determine the position of pedestrians from a pair of RGB and thermal infrared images. Given a pair of RGB and thermal infrared image to be detected, this method firstly extracts multispectral features from the RGB and thermal infrared images; then the extracted multispectral features are fused by using a target aware fusion strategy; finally, the fused features are sent to a detection head for pedestrian detection, and the pedestrian position box and confidence are output. The method can effectively fuse the deep features of multispectral images, enhance the feature expression of pedestrian areas and suppress irrelevant background noise features during the fusion process, and can realize accurate pedestrian detection.

3 Claims, 7 Drawing Sheets

(51) Int. Cl.

| | |
|---|---|
| ***G06V 10/778*** | (2022.01) |
| ***G06V 10/80*** | (2022.01) |
| ***G06V 10/82*** | (2022.01) |

(56) References Cited

FOREIGN PATENT DOCUMENTS

| | | | | | |
|---|---|---|---|---|---|
| CN | 113688722 A | | 11/2021 | | |
| CN | 113902965 A | * | 1/2022 | ........... | G06F 18/253 |
| CN | 114445442 A | | 5/2022 | | |
| CN | 115457456 A | * | 12/2022 | ............. | G06V 20/53 |
| WO | 2021088300 A1 | | 5/2021 | | |

OTHER PUBLICATIONS

J. U. Kim, S. Park, and Y. M. Ro, "Uncertainty-guided cross-modal learning for robust multispectral pedestrian detection," IEEE Trans. Circuits Syst. Video Technol., vol. 32, No. 3, pp. 1510-1523, Mar. 2022. (Year: 2022).*

K. Dasgupta, A. Das, S. Das, U. Bhattacharya, and S. Yogamani, "Spatio-contextual deep network-based multimodal pedestrian detection for autonomous driving," IEEE Trans. Intell. Transp. Syst., vol. 23, No. 9, pp. 15940-15950, Sep. 2022. (Year: 2022).*

K. Zhou, L. Chen, and X. Cao, "Improving multispectral pedestrian detection by addressing modality imbalance problems," in Proc. Eur. Conf. Comput. Vis. (ECCV), 2020, pp. 1-29. (Year: 2020).*

Y.-T. Chen, J. Shi, Z. Ye, C. Mertz, D. Ramanan, and S. Kong, "Multimodal object detection via-probabilistic ensembling," in Proc. Eur. Conf. Comput. Vis. (ECCV), 2022, pp. 1-20. (Year: 2022).*

Wang, L., Hu, Z., Kong, Q., Qi, Q., & Liao, Q. (2023). Infrared and Visible Image Fusion via Attention-Based Adaptive Feature Fusion. Entropy (Basel, Switzerland), 25(3), 407. https://doi.org/10.3390/e25030407 (Year: 2023).*

Q. Li, C. Zhang, Q. Hu, H. Fu and P. Zhu, "Confidence-Aware Fusion Using Dempster-Shafer Theory for Multispectral Pedestrian Detection," in IEEE Transactions on Multimedia, vol. 25, pp. 3420-3431, 2023, doi: 10.1109/TMM.2022.3160589. (Year: 2023).*

Y. Zhu, C. Li, J. Tang and B. Luo, "Quality-Aware Feature Aggregation Network for Robust RGBT Tracking," in IEEE Transactions on Intelligent Vehicles, vol. 6, No. 1, pp. 121-130, Mar. 2021, doi: 10.1109/TIV.2020.2980735. (Year: 2021).*

Chinese Office Action mailed Nov. 13, 2025, issued in related Chinese Application No. 202310319227.1, 14 pages.

Baek, Na Rae, et al. "Pedestrian gender recognition by style transfer of visible-light image to infrared-light image based on an attention-guided generative adversarial network." Mathematics 9.20 (2021): 2535.

Zhang Weilin. Research on Image Fusion and Target Detection Algorithm Based on Multi-sensor Infrared Imaging System [D]. Shandong: Shandong University, 2020.

International Search Report (PCT/CN2023/085308); Date of Mailing: Nov. 4, 2023.

Progress-and-Application-of-Multi-Spectral-Data-Fusion-Methods.

* cited by examiner

RGB-T MULTISPECTRAL PEDESTRIAN DETECTION METHOD BASED ON TARGET AWARE FUSION STRATEGY

CROSS-REFERENCE TO RELATED APPLICATIONS

The present application is a continuation of International Application No. PCT/CN2023/085308, filed on Mar. 31, 2023, which claims priority to Chinese Application No. 202310319227.1, filed on Mar. 29, 2023, the contents of both of which are incorporated herein by reference in their entireties.

TECHNICAL FIELD

The present disclosure relates to an RGB-T (Thermal) multispectral image pedestrian detection method, and in particular, to a pedestrian target position acquisition method based on multispectral images, which is applied to the fields of unmanned driving, road condition perception, intelligent monitoring and the like.

BACKGROUND

Whether the input image or video contains pedestrians can be determined through pedestrian detection. In the field of intelligent transportation, the situation of pedestrians on road conditions may be determined by pedestrian detection, thereby providing a reference for unmanned decision-making. In the field of intelligent security, pedestrian detection can further be used to reflect the personnel situation at a security scene and remind security personnel of possible risks.

At present, pedestrian detection methods are mainly based on RGB images. Although the methods can show excellent detection performance in scenes with good lighting conditions, their performance in scenes with poor lighting conditions is unsatisfactory, which is caused by the low signal-to-noise ratio of RGB images in low light conditions. The thermal infrared image is sensitive to human thermal radiation, and it is not affected by lighting conditions, and thus it can provide all-weather clear human shape information. However, thermal infrared images can only provide shape information but not color and texture information, which makes the pedestrian detection method based on thermal infrared images vulnerable to objects with similar pedestrian structures. Therefore, the multispectral pedestrian detection method came into being, which combines the advantages of RGB and thermal infrared images to achieve all-weather pedestrian detection.

The multispectral pedestrian detection method has been widely concerned by researchers because of its robust pedestrian detection performance. "Multispectral Deep Neural Networks for Pedestrian Detection" studies the influence of multispectral features on detection results at different stages of neural networks, and it designs three fusion methods. One is to directly concatenate RGB and thermal infrared images into four-channel images and send them to the neural network to output the detection results, and this method is called early fusion. One is to send RGB and thermal infrared images to the neural network respectively, and then fuse the middle layer features of the neural network, and complete the detection based on the fused features, and this method is called mid fusion. One is to send RGB and thermal infrared images into two separate neural networks and fuse their detection results, and this method is called late fusion. This study found that the detection effect of mid fusion is better than that of early fusion and late fusion. Based on this discovery, the mid fusion strategy is mainly adopted in the subsequent research.

Although fusing multispectral features can provide complementary information for a single spectrum, simply concatenating multispectral features to achieve feature fusion cannot significantly improve the detection performance. In order to solve this problem, recent research work has proposed different feature fusion strategies. These fusion strategies can be divided into two types according to whether segmentation branches are required during feature fusion: one is fusion with segmentation branches, and the other is fusion without segmentation branches.

For the feature fusion strategy that does not need to segmentation branches during fusion, "Weakly Aligned Cross-modal Learning for Multispectral Pedestrian Detection" focuses on solving the problem of unregistering in multispectral data. It uses two separate neural networks to extract multispectral features and predict the displacement relationship between multispectral features, so as to realize pedestrian detection of weakly registered multispectral data.

"Improving Multispectral Pedestrian Detection by Addressing Modality Imbalance Problems" realizes the differences of multispectral data and solves the problem of information imbalance in cross-modal data.

"Spatio-contextual Deep Network-based Multimodal Pedestrian Detection for Autonomous Driving" focuses on solving the problem of spatial and contextual information aggregation in the process of multispectral feature fusion. It uses a graph attention network to fuse multispectral features, and uses a conditional random field to process the spatial information of the fused features, and then uses a channel attention mechanism and a cyclic neural network to process the contextual information of the fused features.

"BAANet: Learning Bi-directional Adaptive Attention Gates for Multispectral Pedestrian Detection" found that it is difficult for RGB images to capture clear pedestrian information in low-light scenes, while in high-temperature but well-lit scenes, because the thermal radiation of pedestrians is similar to that of other objects in the environment, it is difficult for thermal infrared images to distinguish pedestrians from other objects. It proposes a two-way attention gating mechanism and a scene illumination classification network, which can adaptively use favorable spectral information under different illumination conditions.

"Learning a Dynamic Cross-modal Network for Multispectral Pedestrian Detection" dynamically combines local and non-local information when fusing multispectral features to achieve better detection performance.

"Multimodal Object Detection via Probabilistic Ensembling" uses ensemble learning to combine the detection results of multiple detectors.

For the feature fusion strategy of using segmentation branches in fusion, "Multispectral Pedestrian Detection via Simultaneous Detection and Segmentation" introduces a new segmentation branch to the original detector, and uses a multi-task loss function to supervise the segmentation and detection network. This method has achieved good detection performance.

"Guided Attentive Feature Fusion for Multispectral Pedestrian Detection" uses a segmentation branch for segmentation mask prediction, and guides cross-spectral and single-spectral attention based on this mask.

"Locality Guided Cross-modal Feature Aggregation and Pixel-level Fusion for Multispectral Pedestrian Detection" uses a segmentation branch for segmentation mask prediction and screen local features from complementary spectral features based on this mask, thus enhancing feature expression at specific positions.

It has been found in recent studies that the method of using segmentation branches in the fusion process is generally superior to the method of not using segmentation branches. Therefore, the present disclosure adopts the strategy of using segmentation branches in the fusion. Different from all the above methods, the present disclosure aims to fuse multispectral features and optimize the fused features, so as to enhance the feature expression of pedestrian areas, inhibit the feature expression of background areas, and achieve a more accurate multispectral pedestrian detection effect.

SUMMARY

In view of the problems existing in the prior art, the present disclosure provides an RGB-T multispectral pedestrian detection method based on a target aware fusion strategy, and the overall process is as follows.

An RGB-T multispectral pedestrian detection method based on a target aware fusion strategy include the following steps: giving a pair of registered visible light RGB and thermal infrared T images, firstly, extracting multispectral features, and then fusing the extracted multispectral features in a feature space based on the target aware fusion strategy; and finally, sending the fused features into a detection head, outputting a position box of a pedestrian and a confidence score, and completing a detection process.

In the above technical solution, further, the step of fusing the extracted multispectral features in a feature space based on the target aware fusion strategy comprises two steps:

S1, aggregating the multispectral features, including: processing the multispectral features by using the feature channel splitting mechanism, and outputting initially fused features; the feature channel splitting mechanism processes the multispectral features in two paths, including: in one path, compressing channel dimensions of the multispectral features by using one convolutional layer, and in the other path, compressing the channel dimensions of the multispectral features by using one convolution layer and a residual module, and then concatenating the multispectral features processed in the two paths in the channel dimensions and outputting the initially fused feature through one convolutional layer. The advantage of aggregating the multispectral features is that it provides more gradient flows for the input multispectral features and can better optimize the multispectral features.

S2, optimizing the multispectral features by optimizing the initially fused features in two paths, including: in one path, processing the correlation vector by using two fully connected layers and in other path, multiplying the initially fused features with the correlation vector processed by the fully connected layers to obtain an optimized feature to be output. The advantage of optimizing the multispectral features is that the weight of each channel feature map is adaptively adjusted according to the correlation between the feature map and the two-dimensional confidence map.

A pedestrian detection model used to implement the above method, wherein in the training process of the detection model, in order to ensure the accuracy of the model, a correlation maximum loss function is designed in the process of multispectral feature optimization. The correlation maximum loss function consists of two parts: 1) the segmentation loss function supervises the consistency between the predicted two-dimensional confidence map and the real confidence map; and 2) the maximized information entropy loss function supervises the maximization of the correlation degree of each position in the correlation vector.

The training process of the detection model includes the following steps:

1) Collecting, by an RGB camera and a thermal infrared camera, multispectral images registered in an application scene.
2) Extracting, by a convolutional neural network, deep features from a RGB image and a thermal infrared image, expressed as $F_{rgb}$ and $F_{thermal}$, respectively, recording the multispectral features output by the convolutional neural network at different levels, and concatenating the extracted multispectral features in a channel direction.
3) Fusing the features concatenated in the channel direction in the feature space by using a target aware fusion module, including the following steps:
4) Performing the following processing at each level:

Firstly, processing the concatenated multispectral features by using a feature channel splitting mechanism to output a initially fused feature Fr:

$$F' = \mathcal{G}(\mathcal{H}([F_{rgb}, F_{thermal}]; \theta_1)), \tag{7}$$
$$F'' = \mathcal{H}([F_{rgb}, F_{thermal}]; \theta_2),$$
$$F_x = \mathcal{H}([F', F'']; \theta_3),$$

where $[F_{rgb}, F_{thermal}]$ represents RGB image features and thermal infrared image features concatenated in the channel direction; $\mathcal{H}(\cdot; \theta_i)$ represents an $i^{th}$ convolutional layer in a multispectral feature aggregation module, and $\theta_i$ represents a learnable parameter of the $i^{th}$ convolutional layer; and $\mathcal{G}(\cdot)$ represents a residual convolution module.

Then, optimizing the initially fused feature $F_x$ in two paths, and outputting an optimized feature $F_y$:

$$F_y = s \otimes F_x, \tag{8}$$
$$s = \sigma(\mathcal{M}(v))$$
$$v = \{v_1, v_2, \ldots, v_c\} = \{m \cdot f_x^1, m \cdot f_x^2, \ldots, m \cdot f_x^c\} \tag{9}$$
$$m = \sigma(\mathcal{H}(F_x; \theta_{seg}))$$

where ⊕ represents a pixel-by-pixel multiplication operation; s represents a correlation vector; $\mathcal{M}$ (·represents a multilayer perceptron consisting of two fully connected layers; m·

$$f_x^i$$

represents a correlation operation between a predicted two-dimensional confidence map m and an $i^{th}$ channel feature map of the initially fused feature $F_x$; and σ(·represents a sigmoid operation; $\theta_{seg}$ represents a learnable parameter of a segmentation branch.

Calculating a correlation maximum loss function according to the predicted two-dimensional confidence map m, a ground-truth two-dimensional confidence map m and the correlation vector s.

$$\mathcal{L}_{corr\_max}(\tilde{m}, m, s) = \mathcal{L}_{seg}(\tilde{m}, m) + \alpha\mathcal{L}_{neg\_entropy}(s) \quad (10)$$

where a ground-truth value of the ground-truth two-dimensional confidence map $\tilde{m}$ is obtained as follows: all regions in labeling boxes corresponding to given pictures are set to 1, and other regions are set to 0; $\mathcal{L}_{seg}(\cdot)$ is a segmentation loss function; $\mathcal{L}_{neg\_entropy}(\cdot)$ is a maximized information entropy loss function; a represents a balance coefficient, which is used to control the weight relationship between two loss functions.

$$\mathcal{L}_{seg}(\tilde{m}, m) = \mathcal{L}_{bce}(\tilde{m}, m) + \mathcal{L}_{dice}(\tilde{m}, m) = -\sum_{i=1}^{h\times w} \tilde{m}_i \log m_i + (1-\tilde{m}_i)\log(1-m_i) + 1 - \frac{2|\tilde{m} \cap m| + \epsilon}{|\tilde{m}| + |m| + \epsilon}, \quad (11)$$

$$\mathcal{L}_{neg\_entropy}(s) = \sum_{i=1}^{c} s_i \log s_i + (1-s_i)\log(1-s_i), \quad (12)$$

$\mathcal{L}_{bce}(\cdot)$ represents a binary cross entropy loss function; $\mathcal{L}_{dice}(\cdot)$ represents a Dice loss function; E is a small constant to prevent division by 0; $m_i$ and $\tilde{m}_i$ represent values of the predicted two-dimensional confidence map m and the ground-truth two-dimensional confidence map $\tilde{m}$ at an $i^{th}$ position; and $s_i$ represents a value of the correlation vector s at the $i^{th}$ position.

5) Repeating the step 4) at different levels of the convolutional neural network, and recording an optimized feature $F_y$ and a loss value $\mathcal{L}_{corr\_max}$ output by the target aware fusion module at the different levels.
6) Sending features of the different levels into a feature pyramid network to fuse multiscale features and recording the fused multiscale features.
7) Inputting the multiscale features obtained in step 6) into the detection head of a detector, and outputting a prediction box and a confidence score corresponding to the prediction box.
8) Calculating and recording a loss value between a prediction result and a real target box
9) Weighting loss values calculated in the step 5) and the step 8).
10) Updating learnable parameters of the convolutional neural network by using a random gradient descent manner based on the loss values obtained in step 9).
11) Repeating the steps 1) to the step 10) until the number of iteration reaches a preset training number, and completing a training process to obtain the detection model.

The present disclosure has the following advantages:

The complementary advantages of RGB and thermal infrared image information are fully used to make up for the deficiency that the current detector is easily affected by illumination conditions, and robust all-weather pedestrian detection is realized. The multispectral feature fusion process is supervised, instead of just using the classification and regression loss of the final detector to supervise the prediction box. The output features of the target aware fusion strategy emphasize the feature expression at the target position and weaken the feature expression on irrelevant background. This feature map can distinguish the target object from irrelevant background noise more obviously, and then help the detector achieve better detection performance. The target aware fusion strategy proposed by the present disclosure is a convenient and universal multispectral feature fusion strategy, which can be used in Faster R-CNN and YOLO to improve their detection performance in multispectral pedestrian detection tasks.

BRIEF DESCRIPTION OF DRAWINGS

FIG. 7(*a*) shows an RGB-T input picture, with RGB image on the left and thermal infrared image on the right. FIG. 7(*b*) show real labels and test results. The green box indicates the real label, and the red box indicates the predicted result.

DESCRIPTION OF EMBODIMENTS

The technical solution of that present disclosure will be further explained with specific examples and accompany drawings.

Examples

The present disclosure provides an RGB-T multispectral pedestrian detection method based on a target aware fusion strategy, which includes the following steps:

Giving a pair of registered visible light RGB and thermal infrared T images, extracting multispectral features, fusing the extracted multispectral features in a feature space based on the target aware fusion strategy, sending the fused features into a detection head, outputting a position box of a pedestrian and a confidence score, and completing a detection process.

The present disclosure further provides a pedestrian detection model for executing the above method, and the training process of the detection model and the specific process of pedestrian detection based on the model will be described below.

Figure 1:
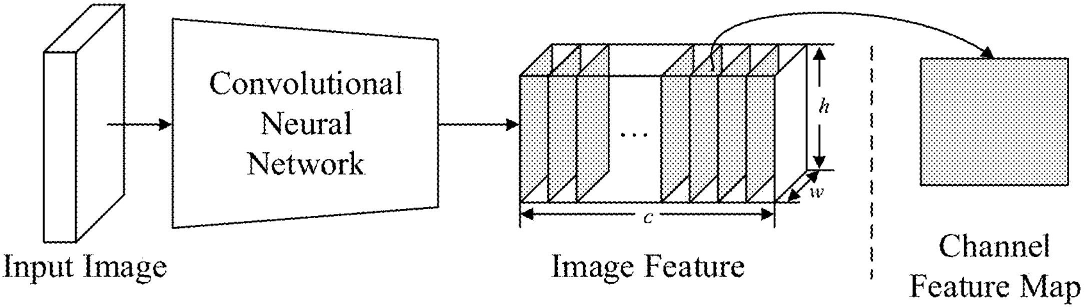
FIG. 1 is the definition of feature and channel feature map in a neural network.

As shown in FIG. 1, the feature and the channel feature map are defined: after an input picture is sent to a neural network, the output result is defined as a feature, and its dimensions are h×w×c, where h, w, c are the height, width and number of channels of the feature, respectively. The matrix of each matrix of h×w in the channel direction is called a channel feature graph.

Figure 2:
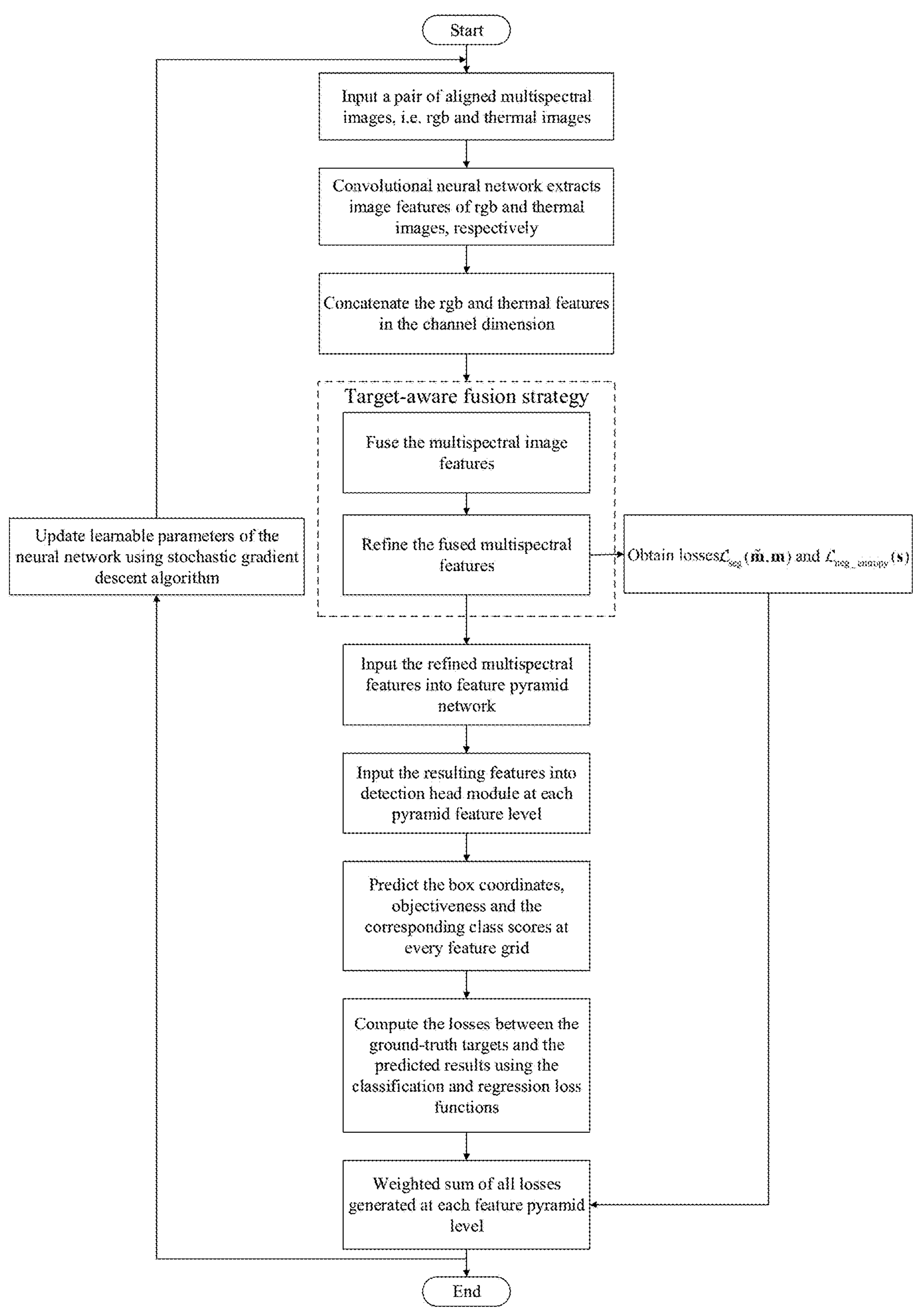
FIG. 2 is a flowchart of a model training stage according to an embodiment of the present disclosure.

The training process of a multispectral pedestrian detection model based on a target aware fusion strategy is shown in FIG. 2.

1) Firstly, multispectral (RGB and terhnal infrared) images registered in an application scene are acquired by using an RGB camera and a thermal infrared camera.

2) A convolutional neural network is used to extract deep features from a RGB image and a thermal infrared image, respectively, which are expressed as $F_{rgb}$ and $F_{thermal}$, respectively. The multispectral features output by the convolutional neural network at different levels are recorded, and the extracted multispectral features are concatenated in a channel direction.

Figure 4:
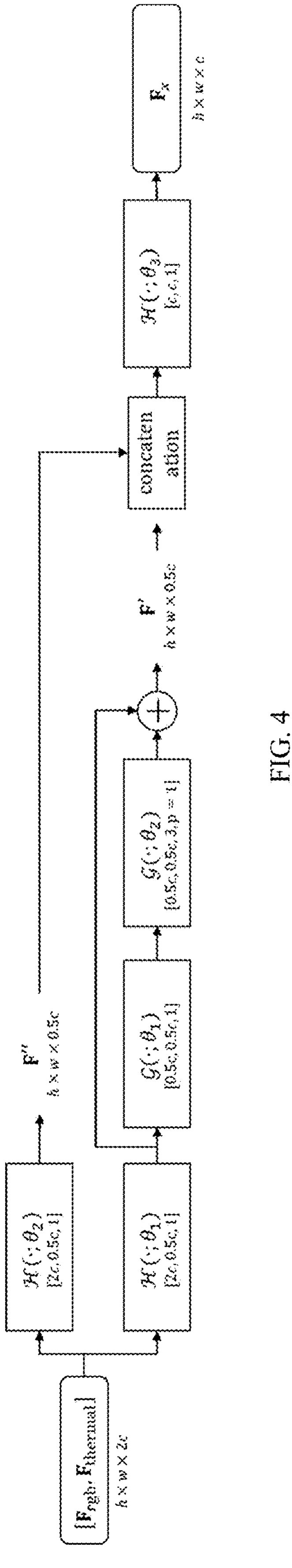
FIG. 4 is a flowchart of a multispectral image feature aggregation module according to an embodiment of the present disclosure.

3) The multispectral features concatenated in the channel direction are fused in the feature space by using a target aware fusion module, which specifically includes the following steps:

4) The following processing is performed at each level:

The target aware fusion module includes a multispectral feature aggregation module and a multispectral feature optimization module. The multispectral feature aggregation module uses the feature channel splitting mechanism to process the concatenated multispectral features and output initially fused feature $F_x$. The multispectral features extracted by the neural network are processed by using the feature channel splitting mechanism, and the multispectral features are processed in two paths: in one path, a convolutional layer is used to compress channel dimensions of the multispectral features, and in the other path, a convolution and residual module is used to compress the channel dimensions of the multispectral features, and then the features processed in the two paths are concatenated in the channel dimensions and the initially fused feature is output through a convolutional layer:

$$F' = \mathcal{G}(\mathcal{H}([F_{rgb}, F_{thermal}]; \theta_1)), \tag{13}$$

$$F'' = \mathcal{H}([F_{rgb}, F_{thermal}]; \theta_2),$$

$$F_x = \mathcal{H}([F', F'']; \theta_3),$$

where $[F_{rgb}, F_{thermal}]$ represents RGB image features and thermal infrared image features concatenated in the channel direction; $\mathcal{H}(\cdot; \theta_i)$ represents an $i^{th}$ convolutional layer in a multispectral feature aggregation module, $\theta_i$ represents a learnable parameter of the $i^{th}$ convolutional layer; and $\mathcal{G}(\cdot)$ represents a residual convolution module. This process is shown in FIG. 4.

The multispectral feature optimization module optimizes the initially fused feature $F_x$ in two paths, and outputs the optimized feature $F_y$, which is specifically as follows: in one path, three layers of convolutional layers are used to process the initially fused feature into a single-channel two-dimensional confidence map, then a correlation vector between the two-dimensional confidence map and an initially fused channel feature map is calculated, and then two layers of fully connected layers are used to process the correlation vector; in the other path, the initially fused feature is multiplied with the above correlation vector processed by the fully connected layers to obtain an optimized feature to be output:

$$F_y = s \otimes F_x, \tag{14}$$

$$s = \sigma(\mathcal{M}(v))$$

$$v = \{v_1, v_2, \ldots, v_c\} = \{m \cdot f_x^1, m \cdot f_x^2, \ldots, m \cdot f_x^c\} \tag{15}$$

$$m = \sigma(\mathcal{H}(F_x; \theta_{seg}))$$

where $\oplus$ represents a pixel-by-pixel multiplication operation; s represents a correlation vector; $\mathcal{M}(\cdot)$ represents a multilayer perceptron consisting of two fully connected layers;

$$m \cdot f_x^i$$

represents a correlation operation between a predicted two-dimensional confidence map m and an $i^{th}$ channel feature map of the initially fused feature $F_x$; and $\sigma(\cdot)$ represents a sigmoid operation; $\theta_{seg}$ represents a learnable parameter of a segmentation branch.

A correlation maximum loss function is calculated according to the predicted two-dimensional confidence map m, a ground-truth two-dimensional confidence map $\tilde{m}$ and the correlation vector s $$\mathcal{L}_{corr\_max}(\tilde{m}, m, s) = \mathcal{L}_{seg}(\tilde{m}, m) + \alpha \mathcal{L}_{neg\_entropy}(s) \tag{16}$$

where a ground-truth value of the ground-truth two-dimensional confidence map $\tilde{m}$ is obtained as follows: all regions in labeling boxes corresponding to given pictures are set to 1, and other regions are set to 0; $\mathcal{L}_{seg}(\cdot)$ is a segmentation loss function; $\mathcal{L}_{neg\_entropy}(\cdot)$ is a maximized information entropy loss function; and a represents a balance coefficient, which is used to control the weight relationship between two loss functions.

$$\mathcal{L}_{seg}(\tilde{m}, m) = \mathcal{L}_{bce}(\tilde{m}, m) + \mathcal{L}_{dice}(\tilde{m}, m) = -\sum_{i=1}^{h \times w} \tilde{m}_i \log m_i + (1 - \tilde{m}_i)\log(1 - m_i) + 1 - \frac{2|\tilde{m} \cap m| + \epsilon}{|\tilde{m}| + |m| + \epsilon}, \tag{17}$$

$$\mathcal{L}_{neg\_entropy}(s) = \sum_{i=1}^{c} s_i \log s_i + (1 - s_i)\log(1 - s_i), \tag{18}$$

Figure 5:
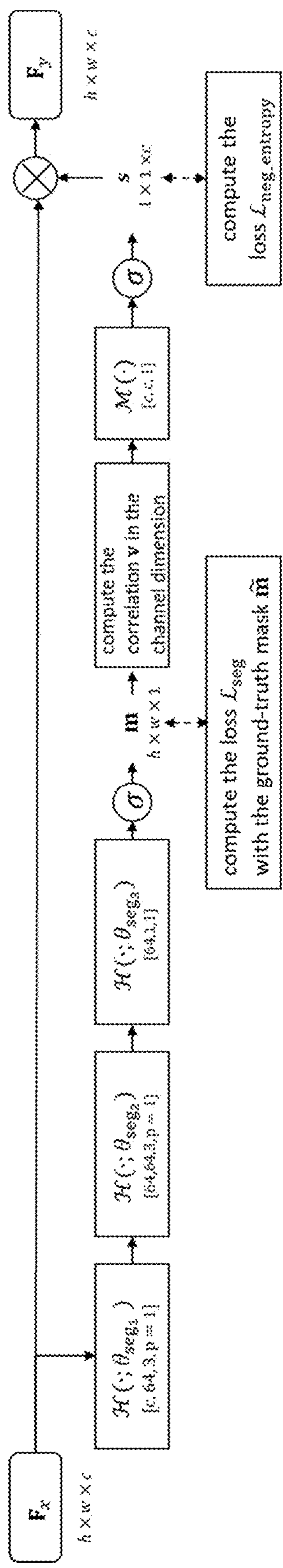
FIG. 5 is a flowchart of a multispectral feature optimization module in the model training stage according to an embodiment of the present disclosure.

$\mathcal{L}_{bce}(\cdot)$ represents a binary cross entropy loss function; $\mathcal{L}_{dice}(\cdot)$ represents a Dice loss function; $\epsilon$ is a small constant, in order to prevent division by 0; m; and $\tilde{m}_i$ represent values of the predicted two-dimensional confidence map m and the ground-truth two-dimensional confidence map $\tilde{m}$ at an $i^{th}$ position; and $s_i$ represents a value of the correlation vector s at the $i^{th}$ position. The optimization process is shown in FIG. 5.

5) Step 4) is repeated at different levels of the convolutional neural network, and an optimized feature $F_y$ and a loss value $\mathcal{L}_{corr\_max}$ output by the target aware fusion module at the different levels is recorded.

6) The features of the different levels are sent into a feature pyramid network to fuse multiscale features and are recorded.

7) The multiscale features obtained in step 6) are input into the detection head of a detector, and a prediction box and a confidence score corresponding to the prediction box are output;

8) A loss value between a prediction result and a real target box is calculated and recorded.

9) The loss values calculated in steps 5) and 8) are weighted.

10) The learnable parameters of the convolutional neural network are updated according to the loss values obtained in step 9) by using a random gradient descent manner.

11) Steps 1)-10) are repeated until the number of iteration reach a preset training number, and completing a training process to obtain the detection model.

Figure 3:
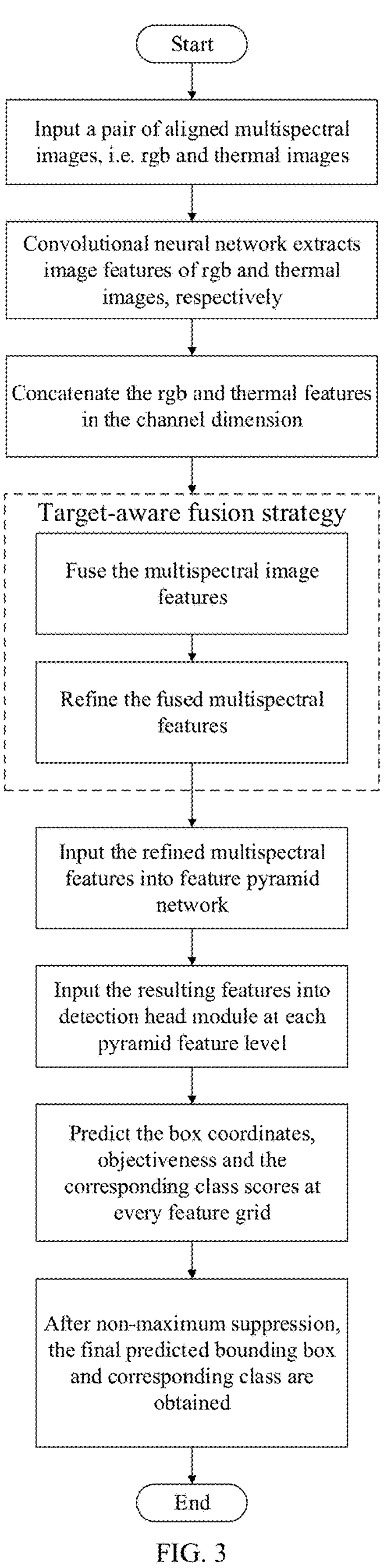
FIG. 3 is a flowchart of pedestrian detection using the model according to the embodiment of the present disclosure.

As shown in FIG. 3, the specific process of pedestrian detection based on the above model is as follows:

1) Firstly, multispectral (RGB and thermal infrared) images registered in an application scene are collected by using an RGB camera and a thermal infrared camera.

2) A convolutional neural network is used to extract deep features from a RGB image and a thermal infrared image, respectively, which are expressed as $F_{rgb}$ and $F_{thermal}$, respectively. The multispectral features output by the convolutional neural network at different levels are recorded, and the extracted multispectral features are concatenated in a channel direction.

3) The multispectral features concatenated in the channel direction are fused in the feature space by using a target aware fusion module, which specifically includes the following steps:

4) The following processing is performed at each level:

The multispectral feature aggregation module processes the concatenated multispectral features by using a feature channel splitting mechanism to output a initially fused feature $F_x$:

$$F' = \mathcal{G}(\mathcal{H}([F_{rgb}, F_{thermal}]; \theta_1)), \quad (19)$$
$$F'' = \mathcal{H}([F_{rgb}, F_{thermal}]; \theta_2),$$
$$F_x = \mathcal{H}([F', F'']; \theta_3),$$

where $[F_{rgb}, F_{thermal}]$ represents RGB image features and thermal infrared image features spliced in the channel direction; $\mathcal{H}(\cdot; \theta_i)$ represents an $i^{th}$ convolutional layer in a multispectral feature aggregation module, and $\theta_i$ represents a learnable parameter of the $i^{th}$ convolutional layer; and $\mathcal{G}(\cdot)$ represents a residual convolution module; this process is shown in FIG. 4.

The multispectral feature optimization module optimizes the initially fused feature $F_x$ in two paths, and outputs the optimized feature $F_y$:

$$F_y = s \otimes F_x, \quad (20)$$
$$s = \sigma(\mathcal{M}(v))$$
$$v = \{v_1, v_2, \ldots, v_c\} = \{m \cdot f_x^1, m \cdot f_x^2, \ldots, m \cdot f_x^c\} \quad (21)$$
$$m = \sigma(\mathcal{H}(F_x; \theta_{seg}))$$

Figure 6:
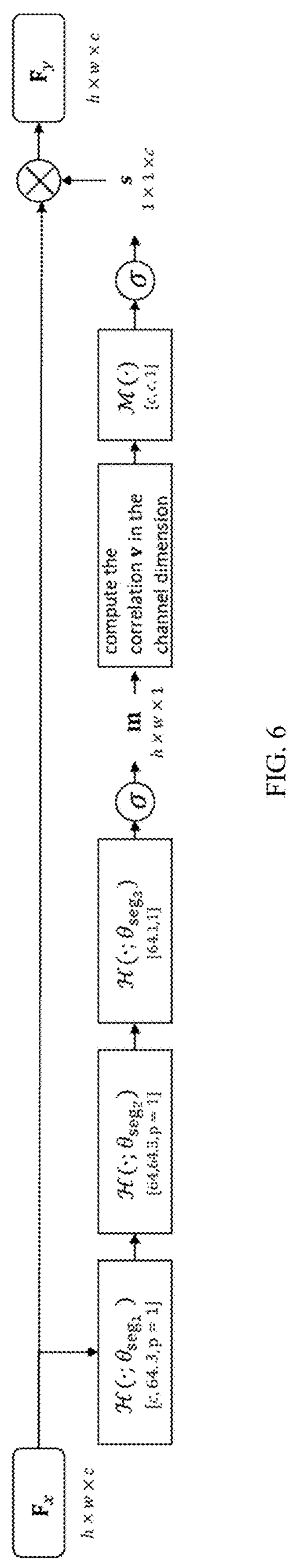
FIG. 6 is a flowchart of the multispectral feature optimization module in the model reasoning stage according to the embodiment of the present disclosure.

$\oplus$ represents a pixel-by-pixel multiplication operation; s represents a correlation vector; $\mathcal{M}(\cdot)$ represents a multilayer perceptron consisting of two fully connected layers; m·

$$m \cdot f_x^i$$

represents a correlation operation between a predicted two-dimensional confidence map and an $i^{th}$ channel feature map of the initially fused feature $F_x$; and $\sigma(\cdot)$ represents a sigmoid operation. This process is shown in FIG. 6.

5) Step 4) is repeated at different levels of the convolutional neural network, and the optimized feature $F_y$ output by the target aware fusion module at different levels is recorded 6) The features of the different levels are sent into a feature pyramid network to fuse multiscale features and are recorded.

7) The output multiscale features are output into the detection head of the detector, and the prediction box and the corresponding confidence score are output to complete the detection process.

Figure 7A:
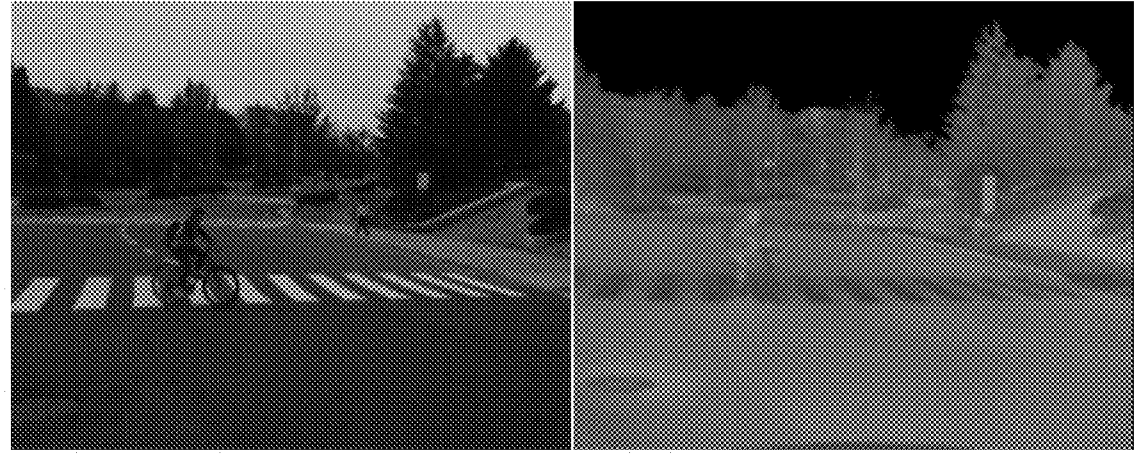
FIGS. 7(*a*) and 7(*b*) show the original input images, real labels and detection results of the embodiment of the present disclosure.
Figure 7B:
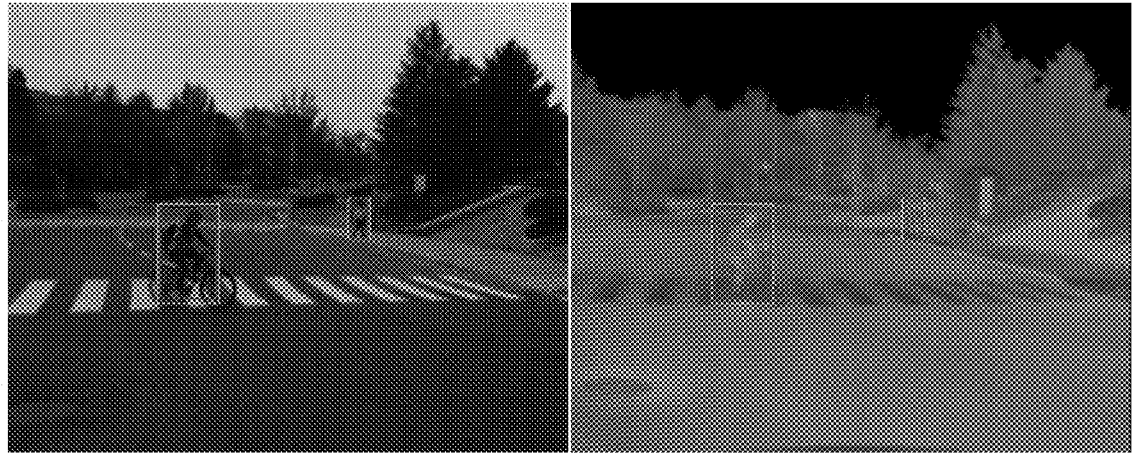

FIGS. 7(*a*) and 7(*b*) show the result of pedestrian detection based on the method of the present invention, from which it can be seen that the detection result of the method of the present disclosure is completely consistent with the real labeling and this method can realize all-weather pedestrian detection.

What is claimed is:

1. An RGB-T multispectral pedestrian detection method based on a target aware fusion strategy, comprising:

giving a pair of registered visible light RGB and thermal infrared T images, extracting multispectral features, fusing the extracted multispectral features in a feature space based on the target aware fusion strategy, sending the fused features into a detection head, outputting a position box of a pedestrian and a confidence score, and completing a detection process;

wherein the detection method is implemented based on an RGB-T multispectral pedestrian detection model based on the target aware fusion strategy, and a training process of the detection model comprises:

step 1) collecting, by an RGB camera and a thermal infrared camera, multispectral images registered in an application scene;

step 2) extracting, by a convolutional neural network, deep features from a RGB image and a thermal infrared image, expressed as $F_{rgb}$ and $F_{thermal}$, respectively, recording the multispectral features output by the convolutional neural network at different levels, and concatenating the extracted multispectral features in a channel direction;

step 3) fusing the multispectral features concatenated in the channel direction in the feature space by using a target aware fusion module, comprising:

step 4) performing following processing at each level:

processing the concatenated multispectral features by using a feature channel splitting mechanism to output a initially fused feature $F_x$:

$$F' = \mathcal{G}(\mathcal{H}([F_{rgb}, F_{thermal}]; \theta_1)), \quad (1.)$$
$$F'' = \mathcal{H}([F_{rgb}, F_{thermal}]; \theta_2),$$
$$F_x = \mathcal{H}([F', F'']; \theta_3),$$

where $[F_{rgb}, F_{thermal}]$ represents RGB image features and thermal infrared image features concatenated in the channel direction; $\mathcal{H}(\cdot; \theta_i)$ represents an $i^{th}$ convolutional layer in a multispectral feature aggregation module, and $\theta_i$ represents a learnable parameter of the $i^{th}$ convolutional layer; and $\mathcal{G}(\cdot)$ represents a residual convolution module;

optimizing the initially fused feature $F_x$ in two paths, and outputting an optimized feature $F_y$:

$$F_y = s \otimes F_x, \quad (2.)$$

wherein, $$s = \sigma(\mathcal{M}(v)) \tag{3.}$$

$$v = \{v_1, v_2, \ldots, v_c\} = \{m \cdot f_x^1, m \cdot f_x^2, \ldots, m \cdot f_x^c\}$$

$$m = \sigma(\mathcal{H}(F_x; \theta_{seg}))$$

where ⊕ represents a pixel-by-pixel multiplication operation; s represents a correlation vector; $\sigma(\cdot)$ represents a sigmoid operation; $\mathcal{M}(\cdot)$ represents a multilayer perceptron comprising two fully connected layers;

$$m \cdot f_x^i$$

represents a correlation operation between a predicted two-dimensional confidence map m and an $i^{th}$ channel feature map of the initially fused feature $F_x$; and $\theta_{seg}$ represents a learnable parameter of a segmentation branch; and calculating a correlation maximum loss function based on the predicted two-dimensional confidence map m, a ground-truth two-dimensional confidence map $\tilde{m}$ and the correlation vector s:

$$\mathcal{L}_{corr\_max}(\tilde{m}, m, s) = \mathcal{L}_{seg}(\tilde{m}, m) + \alpha\mathcal{L}_{neg\_entropy}(s) \tag{4.}$$

wherein a ground-truth value of the ground-truth two-dimensional confidence map $\tilde{m}$ is obtained as follows: all regions in labeling boxes corresponding to given pictures are set to 1, and other regions are set to 0; $\mathcal{L}_{seg}(\cdot)$ is a segmentation loss function; $\mathcal{L}_{neg\_entropy}(\cdot)$ is a maximized information entropy loss function; and $\alpha$ represents a balance coefficient for controlling a weight relationship between two loss functions;

$$\mathcal{L}_{seg}(\tilde{m}, m) = \mathcal{L}_{bce}(\tilde{m}, m) + \mathcal{L}_{dice}(\tilde{m}, m) = -\sum_{i=1}^{h\times w} \tilde{m}_i \log m_i + (1 - \tilde{m}_i)\log(1 - m_i) + 1 - \frac{2|\tilde{m} \cap m| + \epsilon}{|\tilde{m}| + |m| + \epsilon}, \tag{5.}$$

$$\mathcal{L}_{neg\_entropy}(s) = \sum_{i=1}^{c} s_i \log s_i + (1 - s_i)\log(1 - s_i), \tag{6.}$$

where $\mathcal{L}_{bce}(\cdot)$ represents a binary cross entropy loss function; $\mathcal{L}_{dice}(\cdot)$ represents a Dice loss function; $\epsilon$ is a small constant to prevent division by 0; $m_i$ and $\tilde{m}_i$ represent values of the predicted two-dimensional confidence map m and the ground-truth two-dimensional confidence map $\tilde{m}$ at an ith position; and $s_i$ represents a value of the correlation vector s at the $i^{th}$ position;

step 5) repeating the step 4) at different levels of the convolutional neural network, and recording an optimized feature $F_y$ and a loss value $\mathcal{L}_{corr\_max}$ output by the target aware fusion module at the different levels;

step 6) sending features of the different levels into a feature pyramid network to fuse multiscale features and recording the fused multiscale features;

step 7) inputting the multiscale features obtained in step 6) into the detection head of a detector, and outputting a prediction box and a confidence score corresponding to the prediction box;

step 8) calculating and recording a loss value between a prediction result and a real target box;

step 9) weighting loss values calculated in the step 5) and the step 8);

step 10) updating learnable parameters of the convolutional neural network by using a random gradient descent manner based on the loss values obtained in the step 9); and step 11) repeating the step 1) to the step 10) until a number of iteration reaches a preset training number, and completing a training process to obtain the detection model.

2. The RGB-T multispectral pedestrian detection method based on the target aware fusion strategy according to claim 1, wherein said fusing the extracted multispectral features in a feature space based on the target aware fusion strategy comprises: step S1, aggregating the multispectral features, comprising: processing the multispectral features by using the feature channel splitting mechanism, and outputting initially fused features; and step S2, optimizing the multispectral features by optimizing the initially fused features in two paths, comprising: in one path, processing the initially fused features into one single-channel two-dimensional confidence map by using three layers of convolutional layers, calculating a correlation vector between the single-channel two-dimensional confidence map and a initially fused channel feature map, and processing the correlation vector by using two fully connected layers are used to; and in other path, multiplying the initially fused features with the correlation vector processed by the fully connected layers to obtain an optimized feature to be output.

3. The RGB-T multispectral pedestrian detection method based on the target aware fusion strategy according to claim 2, wherein in the step S1, the feature channel splitting mechanism processes the multispectral features in two paths, comprising: in one path, compressing channel dimensions of the multispectral features by using one convolutional layer, and in other path, compressing the channel dimensions of the multispectral features by using one convolution layer and a residual module, and then concatenating the multispectral features processed in the two paths in the channel dimensions and outputting the initially fused feature through one convolutional layer.

* * * * *